(12) United States Patent
Park et al.

(10) Patent No.: US 9,017,855 B2
(45) Date of Patent: *Apr. 28, 2015

(54) CONNECTION-MEMBER FOR ELECTRICAL CONNECTION OF BATTERY CELLS

(75) Inventors: Jongho Park, Seoul (KR); Ki Hyun Jeon, Seoul (KR); Bong Hyup Kang, Seoul (KR); Yongho Cho, Gyeonggi-do (KR); Joonyoung Shin, Incheon (KR); Man-Chul Hur, Seoul (KR); HakJun Lee, Seoul (KR)

(73) Assignee: LG Chem, Ltd. (KR)

( * ) Notice: Subject to any disclaimer, the term of this patent is extended or adjusted under 35 U.S.C. 154(b) by 1489 days.

This patent is subject to a terminal disclaimer.

(21) Appl. No.: 12/442,610

(22) PCT Filed: Sep. 14, 2007

(86) PCT No.: PCT/KR2007/004444
§ 371 (c)(1),
(2), (4) Date: Jun. 8, 2010

(87) PCT Pub. No.: WO2008/038916
PCT Pub. Date: Apr. 3, 2008

(65) Prior Publication Data
US 2010/0255355 A1 Oct. 7, 2010

(30) Foreign Application Priority Data
Sep. 25, 2006 (KR) ......................... 10-2006-0092599

(51) Int. Cl.
*H01M 10/02* (2006.01)
*H01M 10/48* (2006.01)
(Continued)

(52) U.S. Cl.
CPC .............. *H01M 2/206* (2013.01); *H01M 2/105* (2013.01); *H01M 2/1077* (2013.01);
(Continued)

(58) Field of Classification Search
CPC ...... H01M 2/202; H01M 2/204; H01M 2/206
USPC ........... 429/99, 121–123, 148, 151, 154, 160; 439/754–764
See application file for complete search history.

(56) References Cited

U.S. PATENT DOCUMENTS 5,527,637 A 6/1996 Nakazawa et al.
5,898,239 A * 4/1999 Kawam ......................... 307/130
(Continued)

FOREIGN PATENT DOCUMENTS

JP 09007564 A 1/1997
JP 2000182538 A 6/2000
(Continued)

OTHER PUBLICATIONS

International Search Report, PCT/KR2007/004444.

*Primary Examiner* — Ula C. Ruddock
*Assistant Examiner* — Amanda Barrow
(74) *Attorney, Agent, or Firm* — Lerner, David, Littenberg, Krumholz & Mentlik, LLP

(57) ABSTRACT

Disclosed herein are a connection member for electrically interconnecting a plurality of battery cells in a battery pack in which the battery cells are mounted, wherein the connection member includes at least two terminal contact parts, which are connected to electrode terminals of neighboring battery cells, and a connection part for interconnecting the terminal contact parts, and wherein the terminal contact parts are lower in height, by a size corresponding to the thickness of a pack case, than the connection part such that the connection member connects the electrode terminals of the battery cells while the connection member is mounted on the outer surface of the pack case, and a battery pack including the same. Consequently, the connection member according to the present invention has the effect of effectively interconnecting the electrode terminals of the battery cells through a simple assembly process. Also, the connection member according to the present invention can be directly mounted on the pack case without using an additional auxiliary member.

10 Claims, 8 Drawing Sheets

(51) Int. Cl.
*H01M 2/20* (2006.01)
*H01M 2/10* (2006.01)
*H01M 10/42* (2006.01)
*H01M 10/613* (2014.01)
*H01M 10/6562* (2014.01)
*H01M 2/34* (2006.01)

(52) U.S. Cl.
CPC ............... *H01M 2/204* (2013.01); *H01M 2/34* (2013.01); *H01M 10/425* (2013.01); *H01M 10/5004* (2013.01); *H01M 10/5065* (2013.01)

(56) References Cited

U.S. PATENT DOCUMENTS

| | | | |
|---|---|---|---|
| 6,097,173 A * | 8/2000 | Bryant, Jr. | 320/107 |
| 6,225,788 B1 | 5/2001 | Kouzu et al. | |
| 6,410,184 B1 * | 6/2002 | Horiuchi et al. | 429/156 |
| 6,428,925 B1 | 8/2002 | Takeno et al. | |
| 6,465,123 B1 | 10/2002 | Baumann et al. | |
| 6,541,154 B2 * | 4/2003 | Oogami et al. | 429/159 |
| 6,641,942 B1 | 11/2003 | Rouillard et al. | |
| 2001/0039150 A1 * | 11/2001 | Saito et al. | 439/736 |
| 2002/0025455 A1 * | 2/2002 | Yoneyama | 429/1 |
| 2003/0215702 A1 * | 11/2003 | Tanjou et al. | 429/127 |
| 2004/0043287 A1 * | 3/2004 | Bando et al. | 429/156 |
| 2004/0043663 A1 * | 3/2004 | Ikeda et al. | 439/627 |
| 2004/0125628 A1 | 7/2004 | Yamada et al. | |
| 2005/0287427 A1 | 12/2005 | Kim et al. | |
| 2006/0170394 A1 | 8/2006 | Ha et al. | |
| 2006/0177734 A1 * | 8/2006 | Yao | 429/160 |
| 2006/0194101 A1 | 8/2006 | Ha et al. | |
| 2010/0015519 A1 * | 1/2010 | Trester et al. | 429/160 |

FOREIGN PATENT DOCUMENTS

| | | | | |
|---|---|---|---|---|
| JP | 2000228178 A | | 8/2000 | |
| JP | 2001-155702 | * | 6/2001 | ............. H01M 2/10 |
| JP | 2001155702 A | | 6/2001 | |
| JP | 2003109674 A | | 4/2003 | |
| JP | 2003-242950 A | | 8/2003 | |
| JP | 2004152706 A | | 5/2004 | |
| JP | 2005100689 A | | 4/2005 | |
| JP | 2005183241 A | | 7/2005 | |
| JP | 2005-317457 A | | 11/2005 | |
| WO | PCT/KR2007/003690 | * | 2/2008 | ............. H01M 2/02 |

* cited by examiner

CONNECTION-MEMBER FOR ELECTRICAL CONNECTION OF BATTERY CELLS

CROSS REFERENCE TO RELATED APPLICATIONS

The present application is a national phase entry under 35 U.S.C. §371 of International Application No. PCT/KR2007/004444, filed Sep. 14, 2007, published in English, which claims priority from Korean Patent Application No. 10-2006-0092599, filed Sep. 25, 2006, all of which are incorporated herein by reference.

FIELD OF THE INVENTION

The present invention relates to a connection member for electric connection between battery cells, and, more particularly, to a connection member for electrically interconnecting a plurality of battery cells in a battery pack in which the battery cells are mounted, wherein the connection member includes at least two terminal contact parts, which are connected to electrode terminals of neighboring battery cells, and a connection part for interconnecting the terminal contact parts, and wherein the terminal contact parts are lower in height, by a size corresponding to the thickness of a pack case, than the connection part such that the connection member connects the electrode terminals of the battery cells while the connection member is mounted on the outer surface of the pack case, and a battery pack including the same.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having a high energy density and a high discharge voltage, on which much research has been carried out and which is now commercially available and widely used.

Depending upon the kinds of external devices in which the secondary batteries are used, the secondary batteries may be used in the form of a single battery or in the form of a battery pack having a plurality of unit cells electrically connected with each other. For example, small-sized devices, such as mobile phones, can be operated for a predetermined period of time with the output and the capacity of one battery. On the other hand, a battery pack needs to be used in middle- or large-sized devices, such as laptop computers, power tools, and hybrid electric vehicles, because high output and large capacity are necessary for the middle- or large-sized devices.

The battery pack is a battery structure in which a plurality of unit cells are electrically connected in series and/or in parallel with each other. It is very important to sequentially connect the unit cells in the battery pack. In a conventional battery pack, electrode terminals of the unit cells are generally connected with each other, in a highly cohesive welding or soldering fashion using conductive connection members, such as plates, such that the unit cells are electrically connected with each other. However, the welding or soldering operation is an operation that requires a sophisticated technique, and therefore, it is necessary to secure skilled technicians and a large work space. Especially when physical impacts are applied to the battery cells, electric short circuits may occur in the battery cells, with the result that the battery cells may catch fire or explode, and therefore, the safety of the battery cells is not guaranteed.

Also, the above-described connection structure needs auxiliary members, such as jigs, to stably fix the plates to the electrode terminals of the unit cells, with the result that the manufacturing costs of the battery pack is increased.

Consequently, there is a high necessity for a connection member of a novel structure that can be easily assembled and does not need the use of an additional auxiliary member.

SUMMARY OF THE INVENTION

Therefore, the present invention has been made to solve the above problems, and other technical problems that have yet to be resolved.

Specifically, it is an object of the present invention to provide a connection member that is capable of effectively interconnecting electrode terminals of battery cells through a simple assembly process.

It is another object of the present invention to provide a connection member that can be directly mounted on a pack case without using an additional auxiliary member.

It is a further object of the present invention to provide a battery pack including such a connection member.

In accordance with one aspect of the present invention, the above and other objects can be accomplished by the provision of a connection member for electrically interconnecting a plurality of battery cells in a battery pack in which the battery cells are mounted, wherein the connection member includes at least two terminal contact parts, which are connected to electrode terminals of neighboring battery cells, and a connection part for interconnecting the terminal contact parts, and wherein the terminal contact parts are lower in height, by a size corresponding to the thickness of a pack case, than the connection part such that the connection member connects the electrode terminals of the battery cells while the connection member is mounted on the outer surface of the pack case.

Consequently, the connection member according to the present invention can be stably mounted on the outer surface of the pack case. Also, the connection member according to the present invention can electrically interconnect the battery cells, which are arranged in various structures.

The material for the connection member is not particularly restricted so long as the connection member electrically interconnects the electrode terminals of the battery cells. Preferably, the connection member is a metal plate.

In a preferred embodiment, the connection part of the connection member is provided with coupling grooves, by which the connection member is mounted to the pack case. In this case, the connection member is mounted to the outer surface of the pack case by a simple coupling fashion.

According to circumstances, the terminal contact parts or the connection part of the connection member may be provided with a protruding external input and output terminal part. Also, the terminal contact parts or the connection part of the connection member may be provided with a protruding voltage-detection connection part. The external input and output terminal part and the voltage-detection connection part may be formed with various shapes and sizes. For example, the external input and output terminal part and the voltage-detection connection part may be integrally or separately formed at one connection member.

In a preferred structure embodiment, four terminal contact parts form vertexes of a quadrangular structure, and four connection parts form sides of the quadrangular structure, such that two laterally neighboring banks are connected in series with each other. In this structure, the connection member can electrically interconnect four battery cells which are arranged in a quadrangular structure in horizontal section.

More specifically, two of the four terminal contact parts may be connected to the cathode terminals (or the anode terminals) of the battery cells which are arranged vertically at the right side or arranged horizontally at the top, and the remaining two terminal contact parts may be connected to the anode terminals (or the cathode terminals) of the battery cells which are arranged vertically at the left side or arranged horizontally at the bottom.

In another preferred structure embodiment, four terminal contact parts, which are arranged in a line, are connected to each other by three connection parts such that two longitudinally neighboring banks are connected in series with each other. In this structure, the connection member can electrically interconnect four battery cells which are arranged in a line. More specifically, two of the four terminal contact parts may be connected to the cathode terminals (or the anode terminals) of the battery cells which are arranged horizontally at the right side or arranged vertically at the top, and the remaining two terminal contact parts may be connected to the anode terminals (or the cathode terminals) of the battery cells which are arranged horizontally at the left side or arranged vertically at the bottom.

In the present invention, two or more cylindrical batteries connected in parallel with each other, while the electrode terminals of the batteries are placed in the same orientation, are referred to as a "bank." Consequently, banks are arranged in the lateral direction of the batteries such that the banks are electrically connected to each other by the connection members corresponding to the arrangement structure.

In accordance with another aspect of the present invention, there is provided a battery pack including the connection member.

In a preferred embodiment, the battery pack has a plurality of battery cells mounted in a pack case including an upper case and a lower case constructed in a hollow structure in which the upper case and the lower case are coupled with each other. The pack case is provided at the positions corresponding to electrode terminals of the battery cells with connection through-holes through which electrode terminals of the battery cells are exposed. In this case, the terminal contact parts of the connection member are connected to the electrode terminals of the battery cells while the connection part of the connection member is mounted to the pack case.

The shape of the upper case and the lower case is not particularly restricted. Consequently, it is possible to manufacture the upper case and the lower case in various shapes. For example, the upper case and the lower case may be coupled with each other in a hexahedral structure such that the battery cells are stably stacked between the upper case and the lower case. Also, the upper case and the lower case may be manufactured in the same shape such that the upper case and the lower case are coupled with each other in a symmetrical structure. In this case, the upper case and the lower case may be coupled with each other without making a distinction between the upper case and the lower case during the assembly of the pack case, whereby high assembly efficiency is accomplished.

Also, the upper case and the lower case may be coupled with each other in various structures without limits. For example, the upper case and the lower case may be coupled with each other through the insertion of hooks into coupling grooves. In this case, the hooks and the coupling grooves may be formed at one side of the interface between the upper case and the lower case such that the hooks correspond to the coupling grooves.

When the upper case and the lower case are constructed in the symmetrical structure as described above, the hooks and the coupling grooves may be formed at the interface between the upper case and the lower case in a symmetrical fashion. More specifically, when the hooks are formed at the upper case at one side of the interface between the upper case and the lower case, and the coupling grooves are formed at the lower case at one side of the interface between the upper case and the lower case, the coupling grooves are formed at the upper case at the other side of the interface between the upper case and the lower case, and the hooks are formed at the lower case at the other side of the interface between the upper case and the lower case, whereby the hooks and the coupling grooves are arranged in a symmetrical structure.

In a preferred embodiment, each of the upper and lower cases is integrally provided at the inner part thereof with a plurality of spacers for supporting the battery cells, and each of the upper and lower cases is provided at the outer surface thereof with a plurality of ventilation openings which communicate with the interior of each of the upper and lower cases.

Preferably, the spacers protrude from the inner part of the pack case by a predetermined length such that the spacers partially surround the outer circumferences of neighboring battery cells. According to circumstances, the pack case may be provided in the outer surface thereof corresponding to the spacers with a plurality of through-holes such that the spacers communicate with the outside of the pack case at the centers thereof. For example, when cylindrical secondary batteries are used as the unit cells of the battery pack, the spacers may be constructed in a structure to partially surround the neighboring four cylindrical secondary batteries. Specifically, when the neighboring four cylindrical secondary batteries are brought into contact with each other, the spacers may be constructed in a hollow cylindrical structure formed by the neighboring four arc parts clustered in an empty space created among the neighboring cylindrical secondary batteries due to the characteristics of a curved surface.

The ventilation openings are located at positions corresponding to the sides of the battery cells mounted in the pack case, i.e., at the side of the pack case excluding the outer surface where the connection members are mounted. In this case, the ventilation openings are located at positions corresponding to the contact interfaces between the battery cells such that heat generated from the battery cells is effectively discharged through the ventilation openings.

Preferably, the pack case is provided at the outer surface thereof with coupling protrusions, which are engaged in the coupling grooves formed at the connection part of the connection member. Specifically, when the connection through-holes are formed at the outer surface of the pack case as in the above-described preferred embodiment, the coupling protrusions may be located at the surface between the connection through-holes. Consequently, the size and shape of the coupling protrusions are not particularly restricted so long as the coupling protrusions correspond to the coupling grooves of the connection member.

In this structure, the coupling protrusions, which are formed at the outer surface of the pack case, may be easily engaged in the corresponding coupling grooves, which are formed at the connection part of the connection member, for example, in a forced fitting fashion.

According to circumstances, the pack case may be provided at the outer surface thereof with grooves having a depth corresponding to the thickness of the connection part of the connection member such that the connection member is more stably mounted to the outer surface of the pack case. As a result, the connection member may be integrally mounted to the outer surface of the pack case.

In the battery pack according to the present invention, the battery pack has a plurality of connection members mounted on the pack case, and the connection members are provided with protruding voltage-detection connection parts. The pack case is provided at one side thereof with a protection circuit unit, and the voltage-detection connection parts are connected to the protection circuit unit via a detection member. In this case, the detection member is preferably a printed circuit board (PCB) or a flexible printed circuit board (FPCB).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| 100, 101, 102: connection members | 200: pack case |
|---|---|
| 300: battery cells | 400: detection member |
| 500: protection circuit module | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
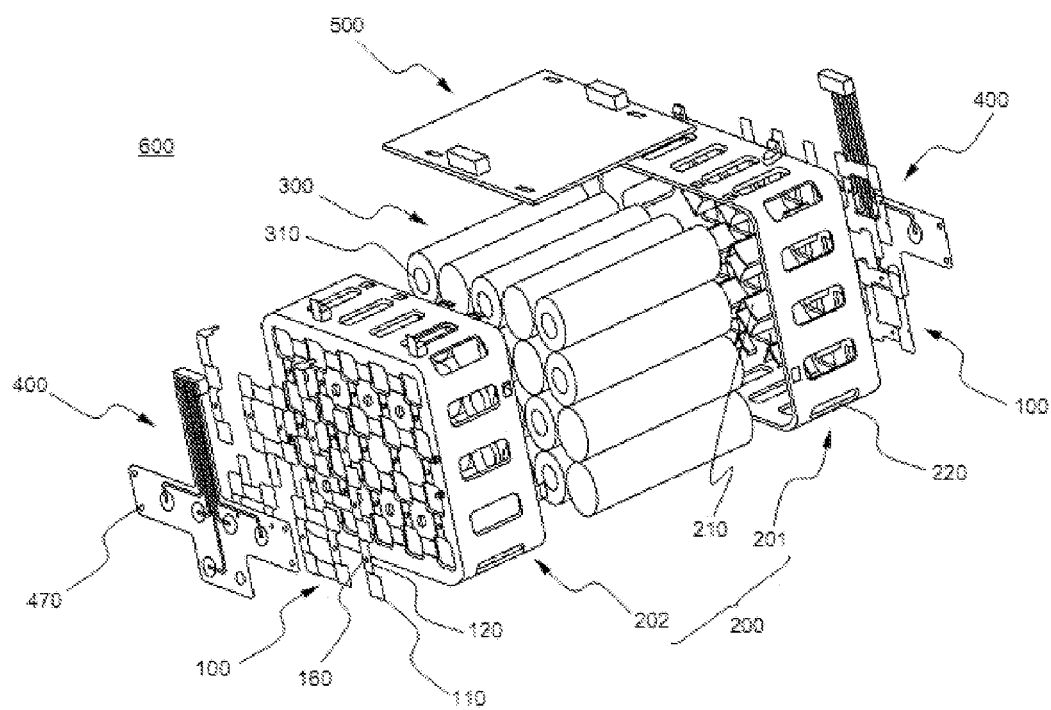
FIG. 1 is an exploded perspective view illustrating a battery pack including various connection members according to preferred embodiments of the present invention.
Figure 2:
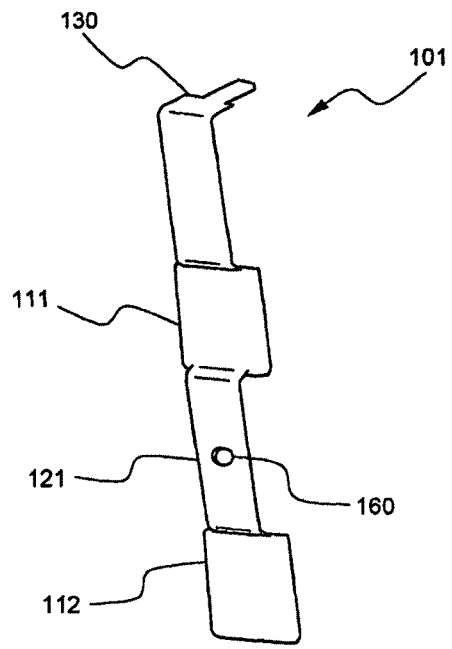
FIGS. 2 to 4 are enlarged views illustrating various connection members according to preferred embodiments of the present invention, which are used in the battery pack of FIG. 1.
Figure 3:
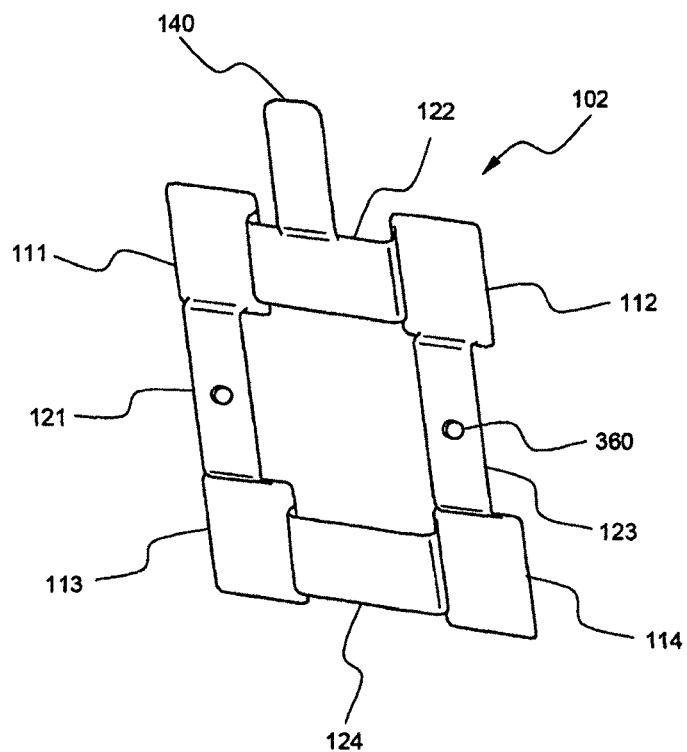
Figure 4:
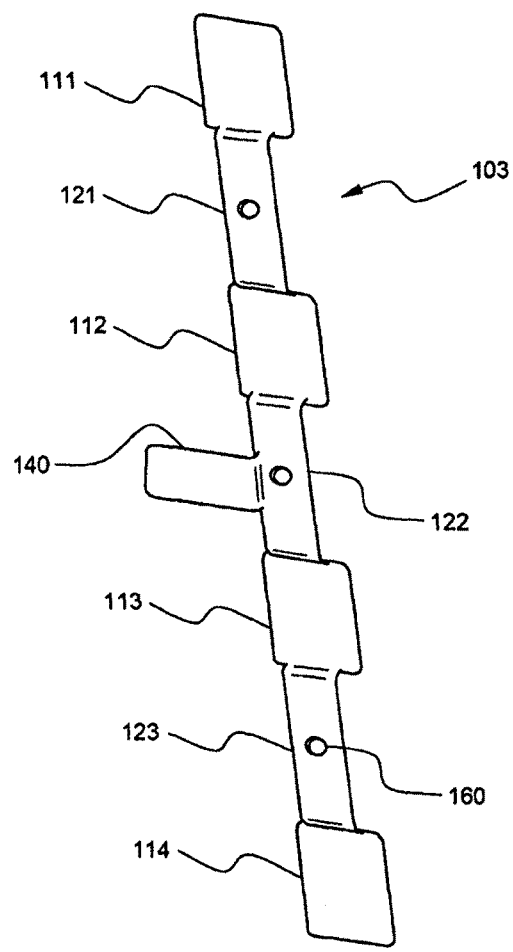

FIG. 1 is an exploded perspective view illustrating a battery pack including various connection members according to preferred embodiments of the present invention, and FIGS. 2 to 4 are enlarged views illustrating various connection members according to preferred embodiments of the present invention, which are used in the battery pack of FIG. 1.

Referring to these drawings, the battery pack 600 includes a battery pack case 200 constructed in a structure in which a plurality of cylindrical battery cells 300 are mounted in the battery pack case 200, various metal plates 100 for electrically connecting the battery cells 300 with each other, a flexible printed circuit board (FPCB) 400 connected to the metal plates 100 for detecting voltages of the battery cells 300, and a protection circuit unit 500 connected to the FPCB 400 for controlling the battery cells 300.

The metal plates 100 include terminal contact parts 110 contacting electrode terminals 310 of the corresponding battery cells 300, and connection parts 120 for connecting the terminal contact parts 110 with each other. Based on the structure of the terminal contact parts 110 and the connection parts 120 of the metal plate 100, the metal plates 100 are divided into A-type metal plates 101, B-type metal plates 102, and a C-type metal plate 103. The metal plates 101 (see FIG. 2), 102 (see FIG. 3), and 103 (see FIG. 4) are illustrated in more detail in FIGS. 2 to 4, which are typically enlarged views of the connection members.

As shown in FIG. 2, each A-type metal plate 101 is constructed in a structure to electrically connect two battery cells arranged in a line. Specifically, each A-type metal plate 101 includes two terminal contact parts 111 and 112 and a connection part 121 for interconnecting the two terminal contact parts 111 and 112. An external input and output terminal part 130 protrudes from the upper terminal contact part 111, and a coupling groove 160 is formed at the connection part 121.

As shown in FIG. 3, each B-type metal plate 102 is constructed in a structure to electrically connect four battery cells arranged in a rectangular shape. Specifically, each B-type metal plate 102 includes four terminal contact parts 111, 112, 113, and 114 and four connection parts 121, 122, 123, and 124 for interconnecting the four terminal contact parts 111, 112, 113, and 114. A voltage-detection connection part 140 protrudes from the connection part 122, which interconnects the two terminal contact parts 111 and 112, and coupling grooves 360 are formed at the connection part 121, which interconnect the terminal contact parts 111 and 113, and the connection part 123, which interconnect the terminal contact parts 112 and 114, respectively.

As shown in FIG. 4, the C-type metal plate 103 is constructed in a structure to electrically connect four battery cells arranged in a line. Specifically, the C-type metal plate 303 includes four terminal contact parts 111, 112, 113, and 114 and three connection parts 121, 122, and 123 for interconnecting the four terminal contact parts 111, 112, 113, and 114. A voltage-detection connection part 140 protrudes from the connection part 122, which interconnects the two terminal contact parts 111 and 113 arranged in the middle of each C-type metal plate 103 in a vertical structure, and coupling grooves 160 are formed at the connection parts 121, 122, and 123, respectively.

Referring back to FIG. 1, the battery pack case 200 includes an upper case 201 and a lower case 202, which are coupled with each other in a symmetrical structure. Each of the upper and lower cases 201 and 202 is integrally provided at the inner part thereof with a plurality of spacers 210 for supporting the cylindrical battery cells 300. Each of the upper and lower cases 201 and 202 is provided at the outer surface thereof with a plurality of ventilation openings 220 which communicate with the interior of each of the upper and lower cases 201 and 202.

Figure 5:
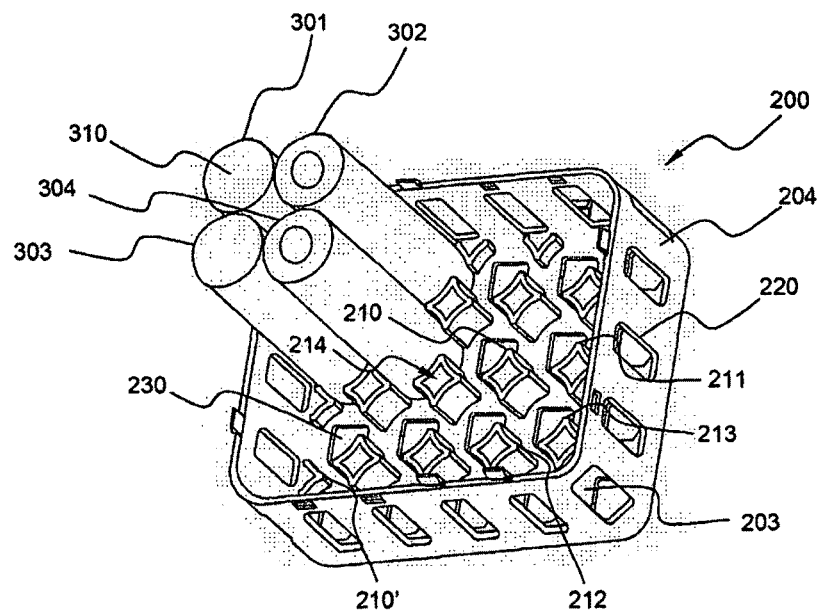
FIG. 5 is a perspective view illustrating the internal structure of a pack case (an upper case or a lower case) constituting the battery pack of FIG. 1.
Figure 6:
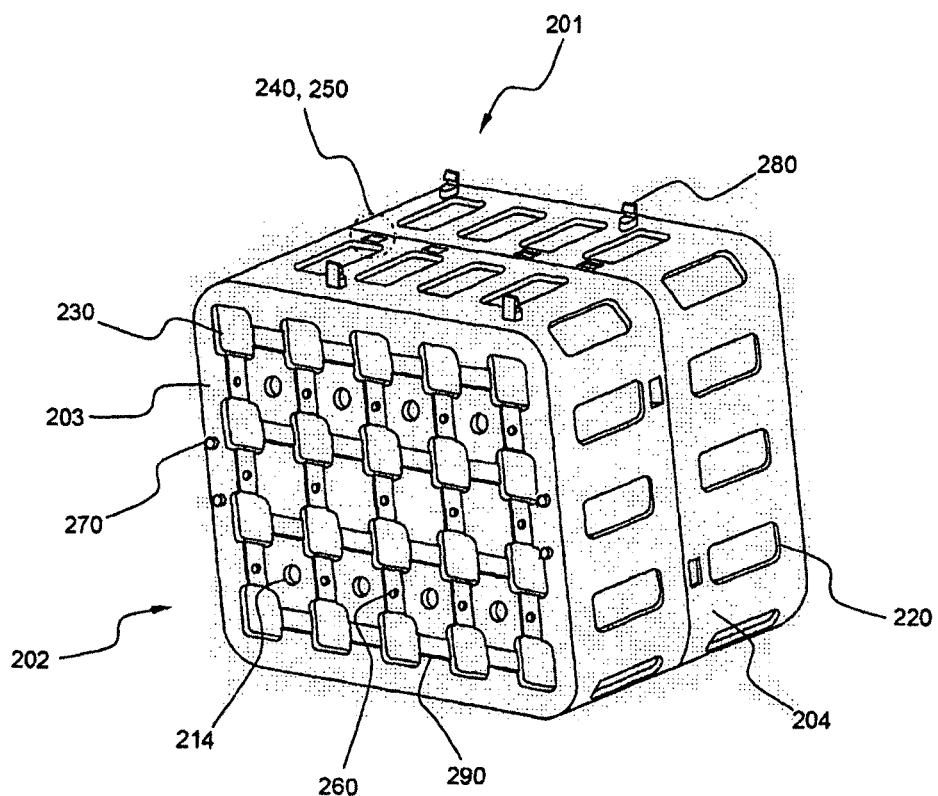
FIG. 6 is a perspective view illustrating a process for mounting a plurality of battery cells in the pack case by coupling the upper case and the lower case with each other during the assembly of the battery pack shown in FIG. 1.

The detailed structure of the pack case is illustrated in more detail in FIGS. 5 and 6. For convenience of description, only one of the upper and lower cases is illustrated in FIG. 5; however, the structure illustrated in FIG. 5 may be applied equally to both the upper case and the lower case.

Referring to FIG. 1 and these drawings, the pack case 200 is constructed generally in a hollow hexahedral structure. The pack case 200 is provided at the bottom 203 thereof with spacers 210 for maintaining the arrangement structure of the battery cells 300 and connection through-holes 230 through which electrode terminals 310 of the battery cells 300 are exposed to the outside of the pack case 200. Also, the pack case 200 is provided at the side 204 thereof with ventilation openings 220 through which heat generated from the battery cells 300 is discharged to the outside of the pack case 200.

The spacers 210 extrude from the inside bottom 203 of the pack case 200. The spacers 210 are arranged such that every neighboring four spacers 210, 211, 212, and 213 form a hollow cylindrical structure. Consequently, each spacer 210 partially surrounds the outer circumferences of neighboring four cylindrical battery cells 301, 302, 303, and 304.

Spacers 210' located at the outermost regions of the pack case 200 along the side 204 of the pack case 200 partially surround the outer circumferences of the neighboring two battery cells 301 and 303 that are located at the outermost regions of the pack case 200. Specifically, the outermost spacers 210' are constructed in a form corresponding to a half of the middle spacer 210. In the center of each spacer 210 is formed a through-hole 214 which communicates with the outside of the pack case 200 through the bottom 203 of the pack case 200. The through-holes 214 of the spacers 210 serve to discharge heat from the battery cells 300 to the outside of the pack case 200 together with the ventilation openings 220.

The connection through-holes 230 are arranged in a structure in which each connection through-hole 230 is located among every neighboring four spacers 210, 211, 212, and 213 such that the electrode terminals 310 of the battery cells 300 are exposed to the outside of the pack case 200 through the bottom 203 of the pack case 200.

Each ventilation opening 220 is located at a position corresponding to the interface between every neighboring two battery cells 301 and 302. Consequently, heat generated from the battery cells 300 is effectively discharged along the interfaces between the respective battery cells 300.

FIG. 6 is a perspective view typically illustrating a process for mounting a plurality of battery cells in the pack case by coupling the upper case and the lower case with each other during the assembly of the battery pack shown in FIG. 1.

Referring to FIG. 6, first hooks 240 and first coupling grooves 250, which correspond to the first hooks 240, are formed at the upper end of the side 204 of the pack case 200. The first hooks 240 and the first coupling grooves 250 are arranged such that the first hooks 240 and the first coupling grooves 250 correspond to each other at the upper ends of the respective sides 204 of the upper case 201 and the lower case 202. Consequently, the two cases 201 and 202 are coupled with each other through the insertion of the first hooks 240 into the corresponding first coupling grooves 250. Also, second hooks 280 are formed at the lower end of the side 204 of the pack case 200 such that the protection circuit unit 500 is mounted to the pack case 200 by means of the second hooks 280.

The pack case 200 is provided at the bottom 203 thereof with a plurality of protrusions 260, by means of which the metal plates 100, for electrically connecting the battery cells 300 with each other, are mounted to the pack case 200, and another plurality of protrusions 270, by means of which the FPCB 400, connected to the metal plate 100 (see FIG. 1) for detecting the voltage of the battery cells 300, is mounted to the pack case 200.

The metal plate mounting protrusions 260 are formed among the connection through-holes 230 along rows of the battery cells 300. The FPCB mounting protrusions 270 are formed at the middle regions of the opposite sides of the bottom 203 of the pack case 200.

Also, the pack case 200 is provided at the bottom 203 thereof with grooves 290, which are constructed in a structure corresponding to the connection parts 120 (see FIG. 1) of the metal plates 100 (see FIG. 1) to interconnect the connection through-holes 130 such that the terminal contact parts 110 of the metal plates 100 are connected to the electrode terminals 310 (see FIG. 5) of the battery cells 300 (see FIG. 5) in position.

Figure 7:
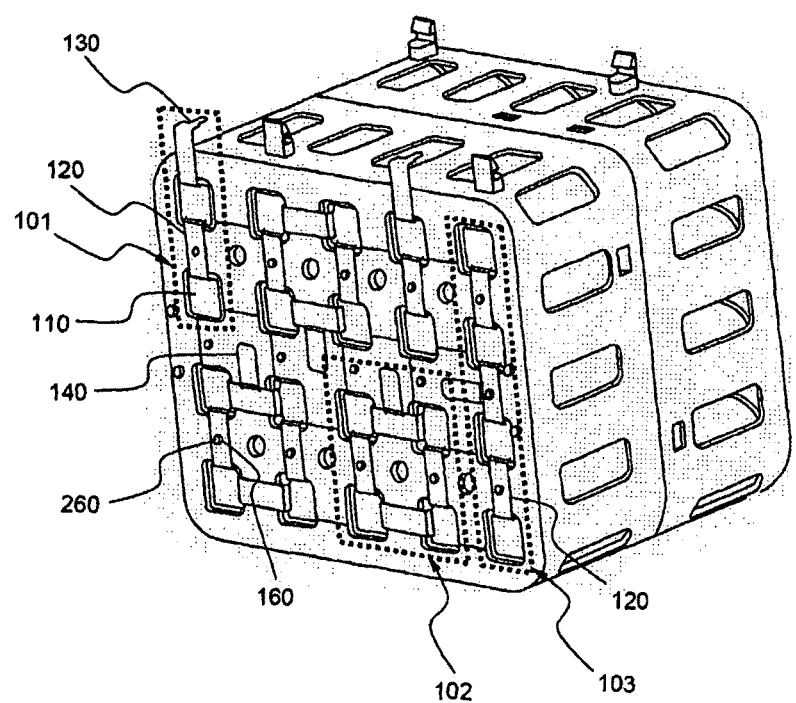
FIG. 7 is a perspective view illustrating a process for mounting the connection members shown in FIGS. 2 to 4 to the outer surface of the pack case shown in FIG. 6 during the assembly of the battery pack shown in FIG. 1.

FIG. 7 is a perspective view illustrating the metal plates, as the connection members, mounted to the battery pack of FIG. 1.

Referring to FIGS. 1 and 7, the metal plates 100 (101, 102, and 103) are mounted to the bottom 203 of the pack case 200 by means of the protrusions 260 so as to electrically connect the electrode terminals 310 exposed to the outside as shown in FIG. 1.

The terminal contact parts 110 of the metal plates 100 are located at the electrode terminals 310 of the battery cells 300 and, the connection parts of the metal plates 100 are located at the grooves 290, formed at the bottom 203 of the pack case 200 as shown in FIG. 6, such that the metal plates 100 electrically connect all the battery cells 300 mounted in the pack case 200 and are stably mounted to the bottom 203 of the pack case 200. The connection parts 120 are provided with grooves 160, which correspond to the metal plate mounting protrusions 260 formed at the bottom 203 of the pack case 200. The terminal contact parts 110 of the metal plates 100 are lower in height, by the thickness of the bottom 203 of the pack case 200, than the connection parts 120 of the metal plates 100 such that the metal plates 100 are more stably mounted to the bottom 203 of the pack case 200.

For each A-type metal plate 101, the external input and output terminal part 130 protrudes from the corresponding terminal contact part 110 toward the side 204 of the pack case 200 to which the protection circuit unit 500 is mounted such that the external input and output terminal part 130 is directly connected to the protection circuit unit 500. For each B-type metal plate 102 and the C-type metal plate 103, on the other hand, the voltage-detection connection part 140 protrudes from the corresponding connection part 120 such that the voltage-detection connection part 140 is connected to the FPCB 400. Especially, the external input and output terminal part 130 of each A-type metal plate 101 is bent at the end thereof such that the protection circuit unit 500 is mechanically fixed by the bent external input and output terminal part 130. The external input and output terminal parts 130 of the A-type metal plates 101 are the final electrode terminals of the battery cells 300 that serve as the external input and output terminals of the battery pack 600.

Figure 8:
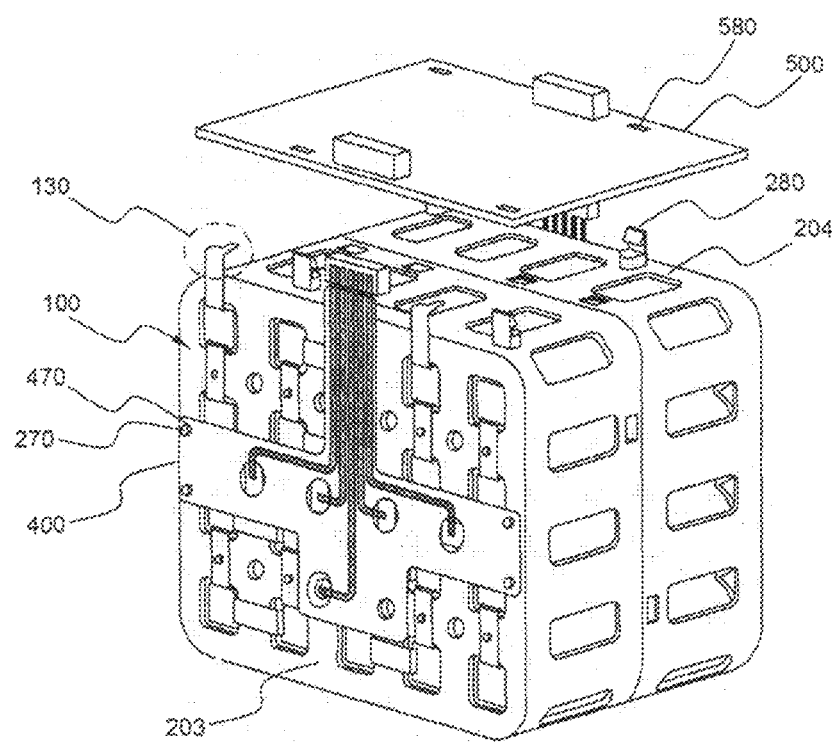
FIG. 8 is a perspective view illustrating a process for mounting a detection member to the connection members shown in FIGS. 2 to 4, such that the detection member is electrically connected to the connection members, and for mounting a protection circuit module to the detection member, such that the protection circuit module is electrically connected to the detection member, during the assembly of the battery pack shown in FIG. 1.

FIG. 8 is a perspective view typically illustrating a FPCB, as the detection member, and a protection circuit unit mounted to the battery pack shown in FIG. 1.

Referring to FIGS. 1 and 8, the FPCB 400 is mounted to the bottom 203 of the pack case 200, by means of the FPCB mounting protrusions 270, such that the FPCB 400 is connected to the external input and output terminal parts 130 of the metal plates 100. The protection circuit unit 500 is mounted to the side 204 of the pack case 200, by means of the second hooks 280, such that the protection circuit unit 500 is electrically connected to the FPCB 400. To this end, the FPCB 400 is provided with grooves 470 corresponding to the FPCB mounting protrusions 270 formed at the bottom 203 of the pack case 200, and the protection circuit unit 500 is provided with coupling grooves 580 corresponding to the second hooks 280 formed at the side 204 of the pack case 200.

The protection circuit unit 500 is primarily coupled to the pack case 200 by means of the second hooks 280 of the pack case 200. However, as previously described in connection with FIG. 5, the coupling force between the protection circuit unit 500 and the pack case 200 may be further increased by the external input and output terminal parts 130 of the A-type metal plates 101.

Figure 9:
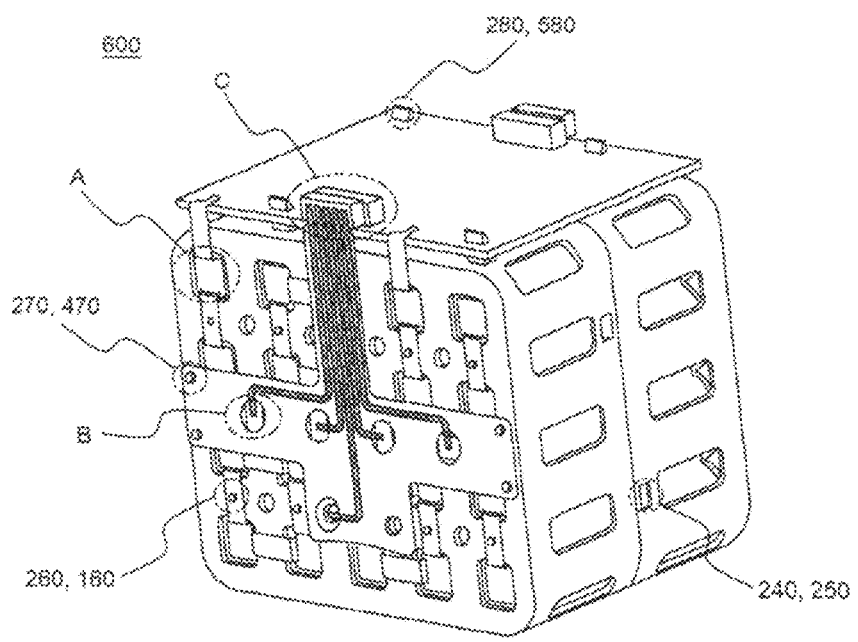
FIG. 9 is a perspective view illustrating a battery pack assembled in accordance with a preferred embodiment of the present invention.

FIG. 9 is a perspective view typically illustrating a battery pack manufactured in accordance with an exemplary structure and process.

Referring to FIGS. 1 and 9, the battery pack 600 is assembled by coupling the upper case 201 and the lower case 202 to each other, while a plurality of battery cells 300 are mounted in a space defined between the upper case 201 and the lower case 202, through the insertion of the first hooks 240 into the corresponding coupling grooves 550, mounting various metal plates 100 to the pack case 200, while the metal plates 100 are connected to the battery cells 300 (see circle A), through the insertion of the metal plate mounting protrusions 260 into the corresponding grooves 160, mounting the FPCB 400 to the pack case, while the FPCB 400, as the detection member, is connected to the metal plates 100 (see circle B), through the insertion of the FPCB mounting protrusions 270 into the corresponding grooves 470, and mounting the protection circuit unit 500 to the pack case 200, while the protection circuit unit 500 is connected to the FPCB 400 (see circle C), through the insertion of the second hooks 280 into the corresponding coupling grooves 580.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Industrial Applicability

As apparent from the above description, the connection member according to the present invention has the effect of effectively interconnecting the electrode terminals of the battery cells through a simple assembly process. Also, the connection member according to the present invention can be directly mounted on the pack case without using an additional auxiliary member.

What is claimed is:

1. A battery pack including a connection member for electric connection of a plurality of battery cells, wherein the battery pack has the battery cells mounted in a pack case including an upper case and a lower case constructed to form a hollow structure in which the upper case and the lower case are coupled with each other, and the pack case is provided at positions corresponding to electrode terminals of the battery cells with connection through-holes through which electrode terminals of the plurality of battery cells are exposed;

wherein each of the upper and lower cases includes a plurality of spacers protruding from an inner part for supporting the battery cells and a plurality of through-holes corresponding to the plurality of spacers such that the plurality of spacers communicate with the outside of the pack case;

wherein the connection member includes at least two terminal contact parts which are connected to electrode terminals of neighboring battery cells, and a connection part for interconnecting the terminal contact parts, in which the connection part is provided with a protruding voltage-detection connection part; and wherein the terminal contact parts are depressed relative to the connection part by a distance corresponding to a thickness of the lower case, such that the connection member connects the electrode terminals of the battery cells while the connection part of the connection member is mounted on an outer surface of the pack case; and wherein the connection part of the connection member is provided with coupling grooves, by which the connection member is mounted to the pack case and the pack case is provided at the outer surface thereof with coupling protrusions, which are engaged with the coupling grooves.

2. The battery pack according to claim 1, wherein the connection member of the battery pack is a metal plate.

3. The battery pack according to claim 1, wherein the terminal contact parts of the connection member is provided with a protruding input and output terminal part.

4. The battery pack according to claim 1, wherein four terminal contact parts form vertexes of a quadrangular structure, and four connection parts form sides of the quadrangular structure, such that the two laterally neighboring banks are connected in series with each other.

5. The battery pack according to claim 1, wherein four terminal contact parts, which are arranged in a line, are connected to each other by three connection parts such that two longitudinally neighboring banks are connected in series with each other.

6. The battery pack according to claim 1, wherein the coupling protrusions are engaged in the corresponding coupling grooves in a forced fitting fashion.

7. The battery pack according to claim 1, wherein the pack case is provided at the outer surface thereof with grooves having a depth corresponding to a thickness of the connection part of the connection member.

8. The battery pack according to claim 1, wherein the pack case is provided at one side thereof with a protection circuit unit, and the voltage-detection connection part is connected to the protection circuit unit via a detection member.

9. The battery pack according to claim 8, wherein the detection member is a printed circuit board (PCB) or a flexible printed circuit board (FPCB).

10. The battery pack according to claim 1, wherein the upper and lower cases further comprise a plurality of ventilations formed parallel with the plurality of cells and located at positions corresponding to interfaces between neighboring battery cells of the plurality of battery cells, the plurality of ventilations being configured to discharge heat therethrough.

* * * * *